United States Patent [19]

White

[11] Patent Number: 4,616,072

[45] Date of Patent: Oct. 7, 1986

[54] HALOGENATED ETHYLENE-CARBON MONOXIDE INTERPOLYMER

[75] Inventor: Mary L. N. White, Lake Jackson, Tex.

[73] Assignee: The Dow Chemical Company, Midland, Mich.

[21] Appl. No.: 740,667

[22] Filed: Jun. 3, 1985

[51] Int. Cl.$^4$ ............... C08G 69/02; C08F 8/22
[52] U.S. Cl. ................... 525/539; 524/569; 525/55; 525/189; 528/392; 528/397
[58] Field of Search ............ 525/539, 185, 55; 528/392, 397; 524/569

[56] References Cited

U.S. PATENT DOCUMENTS 3,689,460  9/1972  Nozaki .................... 528/392
3,694,412  9/1972  Nozaki .................... 528/392
3,780,140  12/1973  Hammer ................. 528/392
3,790,460  2/1974  Weintraub ............. 528/392

OTHER PUBLICATIONS

Degradation and Stabilisation of PVC, E. D. Owen (ed.) (Elsevier Applied Science Publishers, New York, 1984), pp. 21–136.

Kawai, W. et al., "Photodehydro-Chlorination of Carbon Monoxide—Vinyl Chloride Copolymer," *Journal of Polymer Science*, vol. 12, pp. 201–210 (1974).

*Primary Examiner*—Harold D. Anderson
*Attorney, Agent, or Firm*—W. J. Lee

[57] ABSTRACT

Halogenated interpolymers of ethylene and carbon monoxide. The halogenated interpolymer is prepared by (a) preparing a mixture of a liquid medium and a backbone polymer having interpolymerized therein ethylene and carbon monoxide, (b) contacting the backbone polymer in the mixture with halogen at conditions effective to react the halogen only with carbon atoms in the alpha position with respect to the carbonyl groups in the backbone polymer, and (c) recovering the halogenated polymer of step (b). The halogenated interpolymer is useful in molding films and articles therefrom and as a plasticizer in polyvinyl chloride resins. In a preferred embodiment, the backbone polymer has a carbon monoxide content of about 8–20 wt. percent and the halogenated interpolymer has a halide content of about 10–24 wt. percent.

22 Claims, No Drawings

HALOGENATED ETHYLENE-CARBON MONOXIDE INTERPOLYMER

FIELD OF THE INVENTION

This invention relates to halogenated interpolymers of ethylene and carbon monoxide, and a method of preparing the same. Further, this invention relates to blends of polyvinyl halide polymers with halogenated interpolymers of ethylene and carbon monoxide.

BACKGROUND OF THE INVENTION

Ethylene copolymers and terpolymers containing interpolymerized carbon monoxide are well known. Blends of polyvinyl chloride with such ethylene-carbon monoxide copolymers and terpolymers are also well known. For example, in Polymer Blends, edited by D. R. Paul and S. Newman, v. 2, p. 227, Academic Press (New York 1978), it was reported that ethylene-carbon monoxide copolymers containing 15 weight percent or more carbon monoxide were compatible with polyvinyl chloride; however, ethylene copolymers containing less than about 14 weight percent carbon monoxide were reported to be incompatible with polyvinyl chloride. On the other hand, ethylene copolymers containing more than about 15 weight percent carbon monoxide are known to be relatively unstable and present processing problems when employed as plasticizers in polyvinyl chloride. For example, in U.S. Pat. No. 3,156,744, it was reported that when an ethylene copolymer with a carbon monoxide content above about 15 weight percent was employed in a polyvinyl chloride, a reduction in the heat-distortion temperature of the product was engendered. Moreover, the products in this patent were described as opaque plastic alloys, indicating that ethylene-carbon monoxide copolymers with a carbon monoxide content less than about 15 weight percent were not generally compatible with polyvinyl chloride on a molecular scale.

Ethylene-vinyl acetate copolymers have also been used as plasticizers with polyvinyl chloride. Generally, these systems have required the use of an ethylene copolymer with a vinyl acetate content of at least 60 percent by weight. However, because of the relatively high cost of vinyl acetate monomer, ethylene-vinyl acetate copolymers are more expensive than the ethylene-carbon monoxide copolymers. Also, ethylene-vinyl acetate copolymers are a gumstock-type material and are more difficult to blend with polyvinyl chloride than are liquid or powdered plasticizers.

It is also possible to employ as a polyvinyl chloride plasticizer a terpolymer of ethylene, vinyl acetate and carbon monoxide. With such terpolymers, one part interpolymerized carbon monoxide can be substituted for approximately four parts vinyl acetate on a weight basis to obtain a terpolymer similar in compatibility with polyvinyl chloride to ehtylene-vinyl acetate copolymers. Such blends are reported, for example, in U.S. Pat. No. 3,780,140.

SUMMARY OF THE INVENTION

According to one aspect of the invention there is provided halogenated ethylene-carbon monoxide interpolymer. The interpolymer includes a backbone of interpolymerized ethylene and carbon monoxide, and halogen substituted substantially only at carbon atoms adjacent carbonyl groups in the backbone.

In another aspect, there is provided a process for preparing a halogenated ethylene-carbon monoxide interpolymer, and a halogenated ethylene-carbon monoxide interpolymer prepared by such a process. The process includes the steps of:
  (a) preparing a mixture of: a backbone polymer having interpolymerized therein ethylene and carbon monoxide; an ionic halogenation catalyst; and a liquid medium;
  (b) contacting the backbone polymer in the mixture with halogen to react the halogen with the backbone polymer; and
  (c) recovering the halogenated polymer from step (b).

The invention further provides a plasticized composition which includes polyvinyl halide resin and a halogenated ethylene-carbon monoxide interpolymer.

DESCRIPTION OF THE PREFERRED EMBODIMENTS

The halogenated interpolymer of the invention includes a backbone which has halogen substituted as described in more detail hereinbelow. The backbone includes randomly interpolymerized ethylene and carbon monoxide. Preferably, the backbone contains from about 55 to about 99 percent interpolymerized ethylene and at least about 1 percent interpolymerized carbon monoxide, by weight of the backbone. More preferably, the backbone contains from about 65 to about 97 weight percent interpolymerized ethylene and from about 3 to about 35 weight percent interpolymerized carbon monoxide, and more especially from about 80 to about 92 weight percent interpolymerized ethylene and from about 8 to about 20 weight percent interpolymerized carbon monoxide. As used herein, the term "backbone" refers to the polymeric structure of the interpolymer of the invention apart from its halide substituents, and the weight percentages of monomers interpolymerized in the backbone are calculated as if the halide substituent were hydrogen. For the purposes of clarity, the term "backbone polymer" is used herein in reference to the interpolymer which is halogenated according to the process of the invention described in more detail hereinbelow.

In another embodiment, the backbone contains an additional interpolymerized monomer, such as, for example, α-olefins having from 3 to 12 carbon atoms, α,β-ethylenically unsaturated carboxylic acids and alkyl esters, amides and nitriles thereof, and alkenyl esters of carboxylic acids. Specific representative examples of such additional monomers include, for example, propylene, 1-butene, 1-pentene, 1-hexene, 1-octene, 1-decene, acrylic acid, methacrylic acid, methyl methacrylic acid, ethacrylic acid, crotonic acid, isocrotonic acid, tiglic acid, angelic acid, senecioic acid, methyl acrylate, n-butyl acrylate, acrylamide, acrylonitrile, vinyl acetate, vinyl formate, and the like. In this embodiment, the backbone preferably contains from about 55 to about 99 weight percent interpolymerized ethylene, at least about 1 weight percent interpolymerized carbon monoxide, with the balance being the interpolymerized additional monomer. More preferably, the backbone contains from about 65 to about 97 weight percent interpolymerized ethylene, from about 3 to about 35 weight percent interpolymerized carbon monoxide, and from about 0 to about 27 weight percent of additional interpolymerized monomer.

The interpolymer of the invention has halide substituted substantially only at carbon atoms adjacent carbonyl groups in the backbone. Preferably, the halogen is present in the halogenated interpolymer in an amount from about 3 to about 40 percent by weight of the halogenated interpolymer, and more especially from about 10 to about 24 weight percent. The halogen is preferably chlorine, but other halogens such as bromine, iodine, or fluorine may be substituted, alone or in combination.

The amount of halogen substituted at the carbonyl-adjacent carbon atoms depends in part on the constitution of the backbone. It has been observed that with backbones having a low carbonyl content, nearly two halide atoms are, on the average, substituted at each carbonyl moiety, i.e. one halide atom at each carbonyl-adjacent carbon. On the other hand, with backbones having a high content of interpolymerized carbon monoxide, one or less halide atoms are, on the average, substituted at each carbonyl moiety. Generally, with backbones of intermediate carbonyl content, from about 1 to about 1.5 halide atoms are, on the average, substituted at each carbonyl moiety. For example, with a backbone containing substantially only ethylene and carbon monoxide, when the carbonyl content varies from about 8 to about 20 percent by weight of the backbone, the chlorinated copolymer obtained has a corresponding chloride content from about 10 to about 24 percent by weight of the halogenated copolymer. It is believed that this result is observed because the carbonyl-adjacent carbon atom will not react with the halogen unless the carbonyl-adjacent carbon atom is a part of at least two polymerized ethylene groups separating the carbonyl group from the next carbonyl group in the backbone.

In preparing the halogenated ethylene-carbon monoxide interpolymer, a mixture is first prepared which includes the backbone polymer to be halogenated, an ionic halogenation catalyst and a liquid medium. The backbone polymer is then contacted in the mixture with the halogen to react the halogen with the backbone polymer. Finally, the halogenated backbone polymer is recovered. The preparation may be batch-wise or by a continuous process.

It is believed that the reaction proceeds according to the general formula:

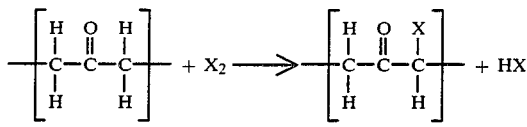

wherein X is halogen and the bracketed groups represent the reactive moieties, before and after halogenation, respectively, of the ethylene-carbon monoxide interpolymer, in which adjacent carbonyl groups are separated by two or more interpolymerized ethylene units including the halide-substituted carbon atom adjacent the carbonyl in the backbone polymer. Also, there will be no halide substitution at some carbonyls, and disubstitution at some others at which both carbonyl adjacent carbon atoms are part of two or more interpolymerized ethylene units separating the next adjacent carbonyl groups in the backbone polymer.

The backbone polymer which is halogenated according to the present invention includes randomly interpolymerized ethylene and carbon monoxide. Preferably, the backbone polymer contains from about 55 to about 99 percent interpolymerized ethylene and at least about 1 percent interpolymerized carbon monoxide, by weight of the backbone polymer. More preferably, the backbone polymer contains from about 65 to about 97 weight percent interpolymerized ethylene and from about 3 to about 35 weight percent interpolymerized carbon monoxide, and more especially from about 80 to about 92 weight percent interpolymerized ethylene and from about 8 to about 20 weight percent interpolymerized carbon monoxide. Preferably, the backbone polymer has a melt flow value of from about 0.1 to about 300, and more especially from about 0.8 to about 6. As used herein, the term "melt flow value" refers to melt flow value obtained according to ASTM D-1238, condition 190° C./2.160 kg (condition E).

In another embodiment, the backbone polymer contains an additional interpolymerized monomer, such as, for example, α-olefins having from 3 to 12 carbon atoms, α,β-ethylenically unsaturated carboxylic acids and alkyl esters, amides and nitriles thereof, and alkenyl esters of carboxylic acids. Specific representative examples of such additional monomers include, for example, propylene, 1-butene, 1-pentene, 1-hexene, 1-octene, 1-decene, acrylic acid, methacrylic acid, methyl methacrylic acid, ethacrylic acid, crotonic acid, isocrotonic acid, tiglic acid, angelic acid, senecioic acid, methyl acrylate, n-butyl acrylate, acrylamide, acrylonitrile, vinyl acetate, vinyl formate, and the like. In this embodiment, the backbone polymer preferably contains from about 55 to about 99 weight percent interpolymerized ethylene, at least about 1 weight percent interpolymerized carbon monoxide, with the balance being the interpolymerized additional monomer. More preferably, the backbone polymer contains from about 65 to about 97 weight percent interpolymerized ethylene, from about 3 to about 35 weight percent interpolymerized carbon monoxide, and from about 0 to about 27 weight percent of additional interpolymerized monomer.

It is essential that the halogen react substantially only with carbon atoms adjacent carbonyl groups in the backbone polymer, or in other words, substantially only wtih carbon atoms in the alpha position with respect to the carbonyl groups. Preferably the halogenation reaction is according to an ionic reaction mechanism, rather than by halogen free radicals. It has been discovered that the presence of halogen free radicals results in halogenation at carbon atoms other than those in the alpha position with respect to the carbonyl groups in the backbone polymer. Halogenation at positions other than alpha to the carbonyl groups results in significant cleavage and cross-linking of the backbone polymer. Thus, the contact of the halogen with the backbone polymer is preferably in the substantial absence of halogen free radicals.

The halogenation can be effected without substantial halogen substitution at non-carbonyl-adjacent carbon atoms by including an ionic halogenation catalyst in the mixture of backbone polymer and liquid. Generally, any Lewis acid or Lewis base which does not promote the formation of halogen free radicals is suitable, although a base would not generally be used because of the higher concentrations required to maintain basic conditions as the reaction proceeds, due to the formation of hydrogen halide by-product. Alternatively, the contact could be carried out at a relatively high temperature of about 90° to 120° C. without the aid of a catalyst; however, such high temperatures are generally less desirable because of the cross-linking and degradation of the polymer which normally occurs at these temperatures.

Suitable contemplated catalysts include, for example, hydrogen halides, aluminum trihalides, boron trihalides, phosphorus trihalides, phosphorus oxyhalides and aromatic sulfonic acids. Specific representative examples include, for example, hydrogen chloride, boron trifluoride, phosphorus trichloride, phosphoryl chloride, p-toluenesulfonic acid and the like. Because of its low cost and ready availability, and because it is produced as a by-product of the halogenation reaction, hydrogen halide is the preferred catalyst, and particularly hydrogen chloride when chlorine is employed as the halogen.

The initial catalyst concentration in the mixture will normally be between about 0.1 to about 1 percent, based on the initial weight of the backbone polymer, preferably about 0.5 weight percent. As the halogenation reaction proceeds, however, hydrogen halide is formed as a by-product and the final concentration of this component may be substantially higher.

The mixture of the backbone polymer, liquid medium and any catalyst may be either a solution or a suspension of finely divided particles of the backbone polymer dispersed in the liquid medium. Liquids suitable as the medium include any liquid in which the halogen and any catalyst employed are at least partially soluble and with which the halogen and the catalyst are substantially non-reactive. Suitable liquids include, for example, water, dioxane, 1,1,1-trichloroethane, chloroform, tetrachloroethylene, carbon tetrachloride, methylene chloride and perchloroethylene. When water is employed as a liquid medium, the mixture is a slurry; when one or more of the other exemplary liquids is used, the backbone polymer is normally soluble therein and the mixture is a solution. In some instances, it may be necessary to heat the mixture to dissolve the backbone polymer therein. These exemplary liquids may be used alone or in combination.

The initial concentration of the backbone polymer in the mixture is not particularly critical, but a concentration of from about 1 to about 25 g per 100 ml of the mixture will normally be employed, typically about 5 g per 100 ml of the mixture. If the polymer concentration is too high, the mixture may be unsuitably viscous, depending on the solubility of the polymer, although as the halogenation reaction proceeds, the polymer may become more soluble or less soluble in the liquid medium.

When a catalyst is employed, the temperature of the mixture will normally be maintained between about 50° and about 75° C., preferably 55° and 65° C. If the temperature is higher than about 75° C., degradation and cross-linking of the polymer may occur, and gaseous reactants (halogen and any hydrogen halide) become less soluble. On the other hand, halogenation may occur at a temperature lower than about 50° C., but the rate of reaction will normally be too slow to be practically considered.

Once the mixture of the backbone polymer, liquid medium and any catalyst has been prepared, the polymer is contacted in the mixture with halogen. The halogen is typically added by sparging or bubbling the halogen gas through the mixture with agitation or stirring thereof. The halogen gas will normally be added to the mixture at a rate of from about 0.1 to about 10 g per minute per 1000 g of the mixture. If the rate is substantially higher than this, the exothermic nature of the reaction may result in a temperature increase of the mixture which is difficult to control, with the result that the polymer may be degraded. Also, if the rate is too high, hydrogen halide employed as a catalyst may be stripped from the mixture, reducing the conversion percentage of the halogen. If the rate is too low, the rate of reaction may be too slow for practical purposes. Preferably, the halogen is added to the mixture at a rate of from about 0.8 to about 2 g per minute per 1000 g of the mixture.

The addition of the halogen to the mixture is preferably in the substantial absence of UV radiation which would result in the formation of halogen free radicals and polymeric free radicals with concomitant polymer instability. Thus, the contact of the mixture with the halogen should be carried out in a reaction vessel which does not permit the transmission of light thereinto.

The reaction will normally be complete in less than about 60 minutes. Preferably, the backbone polymer concentration, the catalyst concentration, the temperature of the mixture and the rate of halogen addition thereto is sufficient to complete the reaction in a period of time of from about 10 minutes to about 20 minutes.

The amount of halogen required depends on the backbone polymer constitution, the desired extent of reaction and the reaction conditions. Typically a halogen conversion of about 50 percent will be observed. As described above, when the carbon monoxide content of the backbone polymer is low, nearly two halide atoms may be reacted for each carbonyl moiety in the backbone polymer because there are, on the average, two carbon atoms in the alpha position with respect to each carbonyl group. On the other hand, when halogenating backbone polymers with a higher content of interpolymerized carbon monoxide, one or less than one mole of halide atoms will be reacted for each mole of carbonyl moieties in the backbone polymer. Generally, with backbone polymers of intermediate carbonyl content, from about one to about 1.5 moles of halide will be reacted for each mole of carbonyl moieties. It has also been observed that less halogen is substituted when the backbone polymer employed has a low molecular weight (as indicated by a high melt flow value). If desired, the amount of halogenation can also be reduced by limiting the halogen reactant.

After the halogenation reaction is complete, the mixture may be, and preferably is, purged with nitrogen or another inert gas to strip unreacted halogen from the mixture. The halogenated interpolymer product can be removed from the mixture by filtration in the case of a slurry, or in the case of a solution by first precipitating the product with a non-solvent such as methanol. The polymer may then be dried in a vacuum, preferably at a lower temperature, typically about 35° C., to substantially remove any residual liquid.

Removal of residual halogen and moisture is generally necessary for a stable product. Storage stability is enhanced by addition of stabilizers conventionally employed to stabilize halogen-containing polymers such as polyvinyl chloride and chlorinated polyethylene.

The chlorinated interpolymer has a wide variety of contemplated uses, including the manufacture of films and molded articles, as a coupling agent in composite materials such as polyolefins, polyvinyls or polystyrene containing mica or glass fibers, and as a passivation agent for materials such as glass, mica or chrysotile asbestos. The halogenated interpolymer is particularly useful as a plasticizer in blends containing polyvinyl halides, such as, for example, polyvinyl chloride, to produce rigid, semi-rigid and flexible articles.

When used in blends containing polyvinyl halides, the backbone polymer preferably has a content of interpolymerized carbon monoxide of from about 8 to about 20 percent by weight of the backbone polymer prior to halogenation, and the halogenated interpolymer preferably has a chloride content of from about 10 to about 24 percent by weight of the halogenated interpolymer.

The halogenated ethylene-carbon monoxide interpolymer is substantially compatible with polyvinyl resins, particularly the chlorinated ethylene-carbon monoxide interpolymer with polyvinyl chloride resins. Being compatible on a molecular scale, the chlorinated ethylene-carbon monoxide interpolymer and the polyvinyl chloride resin may be employed in the blend in virtually any relative proportion, but the chlorinated ethylene-carbon monoxide interpolymer of the invention will normally be employed in an amount of from about 3 to about 2000 parts by weight per 100 parts by weight of the polyvinyl chloride. To form rigid articles from the blend, it is preferred to use from about 3 to about 18 parts of the halogenated interpolymer; to form semi-rigid articles, from about 18 parts to about 65 parts; and to form flexible articles, from about 40 to about 2000 parts, all by weight per 100 parts polyvinyl chloride.

When recovered from the halogenation mixture, the halogenated interpolymer is substantially free of cross-linking and is still substantially soluble in solvents such as, for example, dioxane, tetrahydrofuran or 1,1,1-trichloroethane. In forming useful articles from the halogenated interpolymer of the invention, and from blends containing the halogenated interpolymer, it should be noted that exposure to heat will cause the halogenated interpolymer to cross-link. The extent of cross-linking generally depends on the constitution of the halogenated interpolymer (primarily the carbon monoxide content), the temperature to which it is exposed, and the time for which it is exposed to the heating. In this respect, the halogenated interpolymer of the invention possesses thermosetting properties which may be desirable in some applications.

The halogenated interpolymer can be cross-linked, or thermoset, for example, by exposure for a sufficient period of time to a temperature of from about 50° to about 180° C. It has also been observed that the presence of stabilizers conventional with halogen-containing polymers will sometimes accelerate the cross-linking. Both the soluble, non-cross-linked, halogenated interpolymer and the cross-linked, or thermoset, halogenated interpolymer are contemplated as being within the scope of this invention.

The preparation and utility of the halogenated interpolymers are demonstrated by the following examples.

EXAMPLE 1

An ethylene copolymer with a copolymerized carbon monoxide content of 12 wt.% and having a melt flow value of 0.857 was chlorinated according to the invention. 40 g of the backbone polymer were dissolved in 800 ml of stabilized 1,1,1-trichloroethane (obtained under the designation CHLOROTHENE NU) by stirring at 74° C. The solution was prepared in a glass reactor which had been painted with black enamel and was equipped with a gas sparger, thermometer and reflux condenser. The solution was cooled to 58° C. by sparging with nitrogen, and a slight turbidity was observed at temperatures below about 65° C. Hydrogen chloride gas was then sparged into the solution for about 5 minutes at a rate of one g/min. Then, chlorine gas was sparged into the solution at a rate of about 2 g/min for 60 minutes. The turbidity disappeared after about 4–5 minutes of sparging with chlorine gas, indicating improved solubility of the partially chlorinated copolymer. After chlorinating for 60 minutes, the solution was purged with nitrogen for 15 minutes to remove residual chlorine and hydrogen chloride. The product was precipitated in 5 volumes (4000 ml) of methanol in 6 aliquots, and subsequently dried in a vacuum oven at 35° C. for about 16 hours. Samples of the partially chlorinated product obtained after 15 minutes of chlorination contained 14.8 wt.% chloride, and after 60 minutes of chlorination, 15.7 wt.% chloride. The product was a white powder and was soluble in carbon tetrachloride, dioxane, tetrahydrofuran, methylene chloride and styrene. A film pressed from the product at 100° C. was clear, elastic and flexible with little color formation.

Comparative Example 1

An ethylene copolymer containing about 12 wt.% carbon monoxide and having a melt flow value of 0.857 was chlorinated with a free radical initiator. 40 g of the copolymer was dissolved in 700 ml 1,1,1-trichloroethane as in Example I except that an unpainted glass reactor was used. 7.4 g of benzoyl peroxide were added. Chlorine gas was sparged through the mixture at 2 g/min for 60 minutes. An amber, resinous precipitate was formed which was not soluble in 1,1,1-trichloroethane or tetrahydrofuran. The product did not appear to melt before it darkened substantially above about 200° C. The product could not be pressed into a film.

Comparative Example II

An ethylene copolymer containing about 12 wt.% carbon monoxide and having a melt flow value of 0.857 was chlorinated by free radical initiation with UV radiation. 40 g of the polymer was dissolved in 600 ml of perchloroethylene and reacted at 65°–70° C. Chlorine gas was sparged through the mixture at 1.5 g/min for 60 minutes while a sun lamp irradiated the reactor. The product was precipitated in methanol and dried in vacuo at 30° C. A film pressed at 90° C. was dark brown and contained bubbles.

EXAMPLE II

The chlorinated ethylene-carbon monoxide copolymer of Example I was blended with 2.5 phr alkyl tin carboxylate stabilizer (obtained from M&T Chemicals, Inc. under the designation THERMOLITE 42) with a Brabender Plastograph at about 80°–90° C. for about 10 minutes. Test specimens measuring 0.1 cm×0.5 cm×3.8 cm were cut with a die from a film pressed at 100° C. under 71 MPa for 4 minutes. Tensile strength at break was about 5.0–5.7 MPa and ultimate elongation was in excess of 700%. Test specimens aged at 50° C. for 5 days had mechanical properties which were not noticeably changed.

EXAMPLE III

The chlorinated ethylene-carbon monoxide copolymer of Example I (50 parts by weight) was blended with very high molecular weight polyvinyl chloride (100 parts) and THERMOLITE 42 stabilizer (4 parts) with a Brabender plastograph at 120° C. for 10 minutes. The blend was pressed into a film at 190° C. with 71 MPa for 4 minutes. The film was light brown, very flexible, tough and stretchy.

EXAMPLE IV

An ethylene terpolymer containing 5 wt.% acrylic acid and 10 wt.% carbon monoxide and having a melt flow value of 3.5 was chlorinated according to the invention. 40 g of the terpolymer was dissolved in 800 ml stabilized 1,1,1-trichloroethane at 74° C., placed in a reactor and cooled to 58° C. as in Example I. Dry hydrogen chloride gas was sparged into the mixture at 1 g/min for 2 minutes. Chlorine gas was then sparged into the mixture at 1.5 g/min for 20 minutes. During the first 10 minutes, the temperature rose to a maximum of 65° C. The mixture was cooled with nitrogen to 55° C. The product was precipitated in 4 volumes of methanol, washed twice with methanol, and dried 72 hours in air at ambient temperature and for 20 minutes in a vacuum oven at 45° C. The product contained 11 wt.% chloride. A film pressed from the product at 90° C. under 3.6 MPa was transparent, colorless and very flexible.

EXAMPLE V

An ethylene copolymer containing 29 wt.% carbon monoxide and having a melt flow value of about 200 was chlorinated according to the invention in a manner similar to Examples I and IV. The product contained 3 wt.% chloride, melted at about 75°-80° C. and began to degrade with strong yellow color formation at about 150° C. The chlorinated copolymer (40 parts), GEON pipe grade polyvinyl chloride (100 parts) and THERMOLITE 42 (2.5 parts) were blended and pressed into a film as in Example III. A light yellow flexible film was formed.

While I have described my invention above, many variations in the illustrated details and materials may occur to those skilled in the art. It is intended that all such variations which fall within the scope and spirit of the appended claims be embraced thereby.

I claim:

1. A process for halogenating ethylene-carbon monoxide interpolymer, comprising the steps of:
   (a) preparing a mixture which includes:
      (i) a backbone polymer having interpolymerized therein ethylene and carbon monoxide;
      (ii) an ionic halogenation catalyst selected from the group consisting of: Lewis acids and Lewis bases; and
      (iii) a liquid medium, said catalyst and halogen being at least partially soluble in said liquid medium and substantially nonreactive therewith;
   (b) contacting said backbone polymer in said mixture with halogen in substantial absence of halogen free radicals to react said halogen with said backbone polymer; and
   (c) recovering said halogenated polymer from step (b).

2. The process of claim 1, wherein said backbone polymer comprises, by weight of said backbone polymer, from about 55 to about 99 percent interpolymerized ethylene and at least about 1 percent interpolymerized carbon monoxide.

3. The process of claim 1, wherein said backbone polymer further comprises additional interpolymerized monomer selected from the group consisting of: α-olefins having from 3 to 12 carbon atoms, α,β-ethylenically unsaturated carboxylic acids and alkyl esters, amides, and nitriles thereof, alkenyl esters of carboxylic acids, and combinations thereof.

4. The process of claim 1, wherein said halogenation catalyst is initially present in said mixture in an amount of from about 0.1 to about 1 percent by weight of said backbone polymer and said catalyst is selected from the group consisting of: hydrogen halides, aluminum trihalides, boron trihalides, phosphorus trihalides, phosphorus oxyhalides, aromatic sulfonic acids, and combinations thereof.

5. The process of claim 1, wherein said halogen is chlorine.

6. The process of claim 1, wherein said liquid medium is present in an amount sufficient to provide a concentration of said backbone polymer of from about 1 to about 25 g per 100 ml of said mixture prior to said halogenation, and said halogen contact with said backbone polymer in said mixture is at a halogen rate of from about 0.1 to about 10 g per minute per 1000 g of said mixture for a period of time less than about 60 minutes.

7. The process of claim 1, further comprising the step of:
   (d) exposing said recovered halogenated polymer to conditions effective to substantially cross-link said halogenated polymer.

8. A process for halogenating an ethylene-carbon monoxide interpolymer, comprising the steps of:
   (a) preparing a mixture which includes:
      (i) a backbone polymer comprising, by weight of said backbone polymer, from about 55 to about 99 percent interpolymerized ethylene and at least about 1 percent interpolymerized carbon monoxide;
      (ii) an ionic halogenation catalyst in an initial amount of from about 0.1 to about 1 percent, by weight of said backbone polymer, said catalyst selected from the group consisting of: hydrogen halides, aluminum trihalides, boron trihalides, phosphorus trihalides, phosphorus oxyhalides, aromatic sulfonic acids, and combinations thereof; and
      (iii) a liquid medium in an amount sufficient to provide an initial concentration of said backbone polymer of from about 1 to about 25 g per 100 ml of said mixture, said catalyst and halogen being at least partially soluble in said liquid medium and substantially nonreactive therewith;
   (b) contacting said backbone polymer in said mixture with chlorine at a chlorine rate of from about 0.1 to about 10 g per minute per 1000 g of said mixture and at a temperature of from about 50° to about 75° C. in substantial absence of halogen free radicals for a period of time less than about 60 minutes to react said chlorine with said backbone polymer; and
   (c) recovering said halogenated polymer from step (b).

9. The process of claim 8, wherein said liquid medium is selected from the group consisting of: water, dioxane, 1,1,1-trichloroethane, chloroform, tetrachloroethylene, carbon tetrachloride, methylene chloride, perchloroethylene and combinations thereof.

10. The process of claim 8, wherein said backbone polymer has a melt flow value of from about 0.1 to about 300 prior to said halogenation and comprises from about 65 to about 97 percent interpolymerized ethylene and from about 3 to about 35 percent interpolymerized carbon monoxide, by weight of said backbone polymer prior to said halogenation.

11. The process of claim 8, wherein said backbone polymer further comprises from about 0 to about 27 percent, by weight of said backbone polymer prior to said halogenation, additional interpolymerized monomer selected from the group consisting of: α-olefins having from 3 to 12 carbon atoms, α,β-ethylenically unsaturated carboxylic acids and alkyl esters, amides, and nitriles thereof, alkenyl esters of carboxylic acids, and combinations thereof.

12. The process of claim 8, wherein said chlorine contact with said backbone polymer in said mixture is at a chlorine rate of from about 0.8 to about 2 g per minute per 1000 g of said mixture.

13. The process of claim 8, wherein said contact is for a period of time of from about 10 to about 20 minutes.

14. The process of claim 8, wherein said contact is in substantial absence of UV radiation.

15. The process of claim 8, wherein said contact is at a temperature of from about 55° to about 65° C.

16. The process of claim 8, further comprising the step of:
(d) exposing said recovered halogenated polymer to a temperature of from about 50° C. to about 180° C. for a period of time sufficient to substantially crosslink said halogenated polymer.

17. A process for halogenating an ethylene-carbon monoxide interpolymer, comprising the steps of:
(a) preparing a mixture which includes:
  (i) a backbone polymer having a melt flow value of from about 0.1 to about 300 and comprising, by weight of said backbone polymer, from about 65 to about 97 percent interpolymerized ethylene, from about 3 to about 35 percent interpolymerized carbon monoxide, and from about 0 to about 27 percent additional interpolymerized monomer selected from the group consisting of: α-olefins having from 3 to 12 carbon atoms, α,β-ethylenically unsaturated carboxylic acids and alkyl esters, amides and nitriles thereof, alkenyl esters of carboxylic acids, and combinations thereof;
  (ii) a catalyst in an initial amount of from about 0.1 to about 1 percent, by weight of said backbone polymer, said catalyst selected from the group consisting of: hydrogen chloride, boron trifluoride, phosphorus trichloride, phosphoryl chloride, p-toluene sulfonic acid, and combinations thereof; and
  (iii) a liquid medium in an amount sufficient to provide an initial concentration of said backbone polymer of from about 1 to about 25 g per 100 ml of said mixture, said liquid medium selected from the group consisting of: water, dioxane, 1,1,1-trichloroethane, chloroform, tetrachloroethylene, carbon tetrachloride, methylene chloride, perchloroethylene, and combinations thereof;
(b) contacting said backbone polymer in said mixture with chlorine at a chlorine rate of from about 0.8 to about 2 g per minute per 1000 g of said mixture and at a temperature of from about 55° to about 65° C. in substantial absence of halogen free radicals and UV radiation for a period of time of from about 10 to about 20 minutes; and
(c) recovering said chlorinated polymer from step (b).

18. The process of claim 17, wherein said mixture is a slurry of finely divided particles of said backbone polymer in said liquid medium.

19. The process of claim 17, wherein said backbone polymer is initially substantially soluble in said liquid medium.

20. The process of claim 17, wherein said catalyst is hydrogen chloride.

21. The process of claim 17, wherein said backbone polymer has a melt flow value of from about 0.8 to about 6 and comprises from about 80 to about 92 percent interpolymerized ethylene and from about 8 to about 20 percent interpolymerized carbon monoxide.

22. The process of claim 17, further comprising the step of:
(d) exposing said recovered halogenated polymer to a temperature of from about 50° C. to about 180° C. for a period of time sufficient to substantially crosslink said polymer.

* * * * *